Dec. 2, 1952

N. E. WIDELL 2,619,804

REFRIGERATOR HAVING PROVISIONS FOR
REDUCING HEAT TRANSFER THEREIN
Filed Dec. 17, 1947

INVENTOR.
Nils Erik Widell
BY
his ATTORNEY

Patented Dec. 2, 1952

2,619,804

UNITED STATES PATENT OFFICE 2,619,804

REFRIGERATOR HAVING PROVISIONS FOR REDUCING HEAT TRANSFER THEREIN

Nils Erik Widell, Stockholm, Sweden, assignor to Aktiebolaget Elektrolux, Stockholm, Sweden, a corporation of Sweden Application December 17, 1947, Serial No. 792,137
In Sweden December 19, 1946

12 Claims. (Cl. 62—99)

This invention relates to refrigerators, and is particularly concerned with maintaining a storage space of a refrigerator at a low temperature.

It is an object of the invention to provide an improvement for maintaining a storage space of a refrigerator at a low temperature, particularly to reduce heat transfer into the space.

Another object is to provide an improvement for maintaining a storage space of a refrigerator at a desired low temperature in order that a larger part of the space will be made available for safely freezing foods and storing frozen food packages without danger of thawing.

A further object is to effectively reduce transfer of heat into such a storage space by a closure member which is employed to close an opening provided to gain access into the space.

A still further object of the invention is to provide an improvement in home freezers and similar refrigerators in which a top access opening of a vertically extending storage space is closed by a lid or cover, particularly to reduce the vertical temperature gradient in the storage space.

Figure 1:
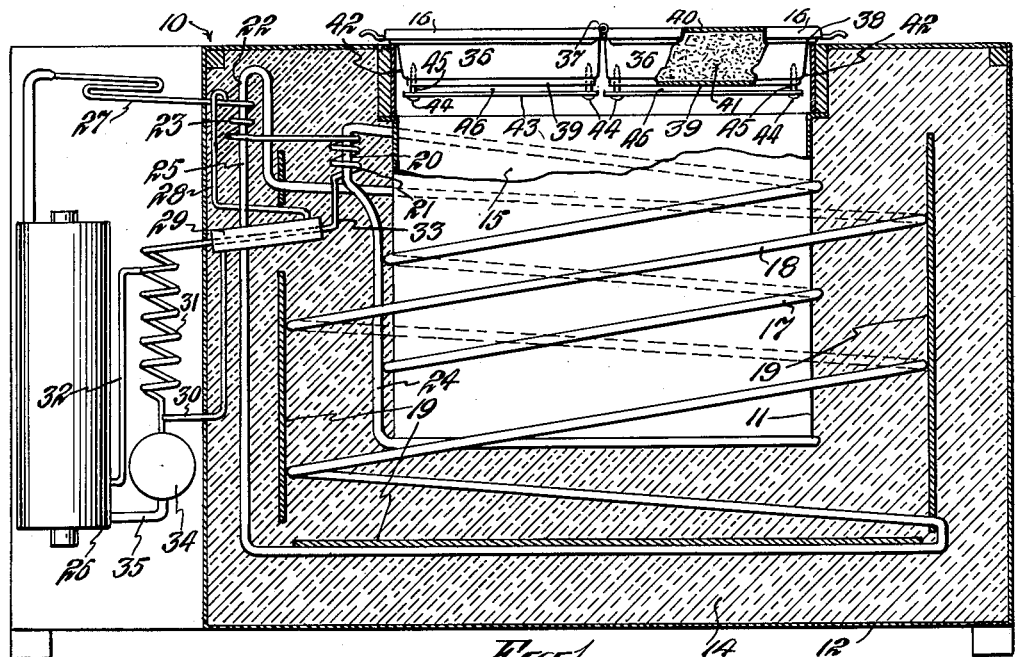
Figure 2:
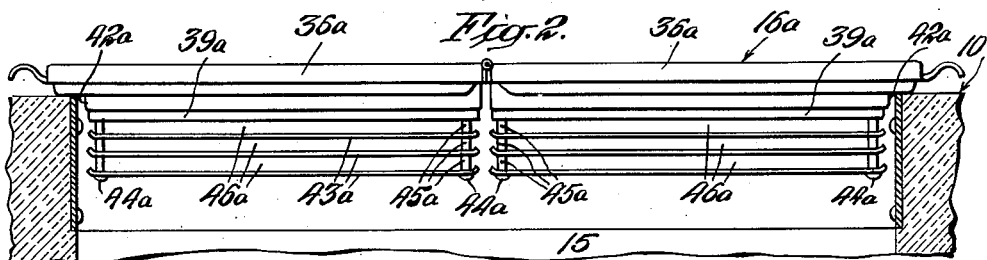
Figure 3:
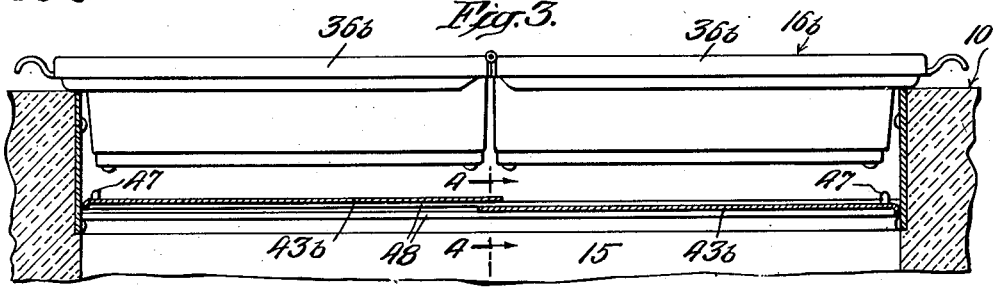
Figure 4:
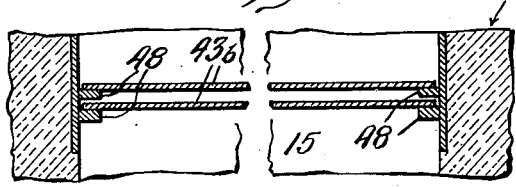

The above and other objects and advantages of this invention will be better understood from the following description and accompanying drawing forming a part of this specification, and of which Fig. 1 is a vertical sectional view of a refrigerator embodying the invention; Figs. 2 and 3 are fragmentary vertical sectional views of a refrigerator like that shown in Fig. 1 illustrating other embodiments of the invention; and Fig. 4 is a fragmentary sectional view taken at line 4—4 of Fig. 3 to show details more clearly.

Referring to Fig. 1, the invention is shown in connection with a refrigerator comprising a cabinet 10 having an inner metal shell 11 arranged to be supported within an outer metal shell 12 and insulated therefrom with any suitable insulating material 14. The inner metal shell 11 defines a thermally insulated storage space 15 for storing frozen food packages and freezing meat, fruit, vegetables, and other foods as well as fruit juices and other liquids. Access to the storage space 15 is had through the open top thereof which is adapted to be closed by a removable closure member or lid 16 containing a suitable insulating material.

The storage space 15 is arranged to be cooled by a plurality of evaporators 17 and 18 in the form of coils which are disposed about the inner metal shell 11, the coil 17 along its length being in good thermal contact with the shell, as by welding, and the coil 18 being spaced from the shell and retained within a plate or shield 19 of annular form which is embedded in the insulating material 14 between the inner and outer metal shells 11 and 12, respectively.

The evaporator 17 is connected to a condenser 20 which is in heat exchange relation with a low temperature cooling element 21, and the evaporator 18 is connected to a condenser 22 which is in heat exchange relation with a higher temperature cooling element 23. Each evaporator and condenser connected thereto forms a secondary heat transfer system, the evaporators being of the flooded type and located at lower levels than the condensers. The evaporator 17 and condenser 20 form a closed fluid circuit which is partly filled with a suitable volatile fluid that evaporates in the evaporator 17 and takes up heat thereby producing cold. The vapor flows from evaporator 17 into condenser 20 in which the vapor is cooled and condensed by cooling element 21. The liquid condensate formed in condenser 20 returns by gravity through conduit 24 to the evaporator 17. The evaporator 18 and condenser 22 connected thereto also form a closed fluid circuit partly filled with a volatile fluid which evaporates in the evaporator 18 and takes up heat from its surroundings, the vapor thus formed flowing to the condenser 22 in which it is cooled and condensed by cooling element 23 and the condensate returning by gravity through a conduit 25 to evaporator 18.

The low and higher temperature cooling elements 21 and 23 may form part of a primary refrigeration system of any suitable type. By way of example, the primary refrigeration system may be of an absorption type containing an inert gas or pressure equalization agent. In such a system refrigerant expelled from solution in a generator 26 by heating and liquefied in a condenser 27 flows through cooling elements 23 and 21 in which the liquid evaporates and diffuses in the presence of an inert gas, thereby producing a refrigerating effect for condensing vapor in the condensers 20 and 22.

The resulting gas mixture of refrigerant and inert gas flows from the upper cooling element 23 through a conduit 28, gas heat exchanger 29 and conduit 30 into the lower part of an absorber coil 31 in which refrigerant vapor is absorbed into a liquid absorbent entering through a conduit 32. Inert gas weak in refrigerant is returned to cooling element 21 through gas heat exchanger 29 and a conduit 33. Absorption liquid enriched in the absorber passes into an absorber vessel 34 and flows therefrom through a conduit 35 to generator 26 where it is heated and refrigerant vapor again is expelled out of solution. The weakened absorption liquid from which refrigerant has been expelled is conducted from the generator 26 through conduit 32 to again absorb refrigerant vapor.

Since inert gas flows first through cooling element 21 and then through cooling element 23, the partial vapor pressure of refrigerant vapor is higher in the cooling element 23 than in cooling element 21, and evaporation of liquid refrigerant takes place at a higher temperature in the upper cooling element than in the lower cooling element. In order to simplify the drawing, the refrigeration system has only been shown diagrammatically, systems of this type being well known which include provisions to insure upward flow of inert gas through the cooling elements 21 and 23 in counterflow to liquid refrigerant.

In the refrigerator just described the closure member 16 comprises two sections 36 hinged at 37, each section having an outer ledge at the underside of which may be provided a sealing jacket 38 formed of rubber, for example, adapted to rest upon the top of the cabinet 10 about the access opening. Closure members of the type illustrated usually comprise structure providing spaced apart inner and outer walls 39 and 40, respectively, having a body of insulation 41 therebetween, and a relatively rigid wall 42 formed of material having poor thermal conductivity which serves as the peripheral edge portion and connects the inner and outer walls. Each cover or lid section 36 is diagrammatically illustrated as having a body of insulation therein which is of conventional and normal depth or thickness. The peripheral edge portion 42 is often referred to as a trim strip which may be an independent part of the closure member or formed integrally with the inner wall 39, for example, in which case the inner wall is also formed of material of poor thermal conductivity.

When the storage space 15 is employed to freeze food and store frozen food packages, it has been observed that the vertical temperature gradient therein is quite substantial, particularly when the storage space is loaded. In order to prevent thawing of the top layer of frozen food packages or other frozen food held in the storage space, it has been the practice not to fill the entire space with food thereby providing a relatively large air space between the top food layer and the closure member 16. While the average or mean temperature in the storage space 15 can be maintained at a lower value to enable a larger part of the space to be safely used for preserving frozen food packages without danger of thawing of the uppermost layer of stored food, this places an additional burden on the refrigeration apparatus provided to cool the storage space. The warmest air in the storage space 15 rises to the upper part thereof at the region immediately below the thermally insulated closure member 16, and it has been found that the thickness or depth of the insulation provided in the closure member exercises very little influence on the vertical temperature gradient in the storage space, that is, the difference in temperature at the top and bottom parts of the space.

In accordance with this invention, it has been found that the vertical temperature gradient in the storage space 15 can be substantially decreased by reducing the transfer of heat into the space by radiation from the underside of the closure member 16. As shown in Fig. 2, this may be accomplished by providing sheets 43 of metal foil at the underside of the cover 16 which are spaced from the inner walls 39 of the cover sections 36. Each sheet 43 is fixed to the inner wall 39 of a cover section 36 by screws 44 and held in fixed spaced relation therefrom by hollow spacer members 45 through which the screws extend. In this way an air gap 46 is formed between the underside of the cover 16 and sheets 43 so that heat radiated from the inner walls 39 toward the sheets is re-radiated from the latter back to the inner walls. The sheets 43 of metal foil may be formed of aluminum, artificial resinous compounds or similar moisture resistant material coated at opposite sides with aluminum foil, or other suitable material having bright reflecting surfaces which effectively reduce heat transfer due to radiation.

The sheets 43 fixed to the inner walls 39 occupy practically the entire horizontal cross-sectional area of the storage space 15 when the cover 16 is positioned to close the access opening thereof and are highly effective to reduce the vertical temperature gradient in the storage space. By providing the sheets 43 it is possible to increase the height to which frozen food packages can be safely stored in storage space 43 without any thawing of frozen food packages in the uppermost layer, and without placing an additional burden on the refrigeration apparatus to maintain the storage space at a lower mean or average temperature.

In Fig. 2 is illustrated another embodiment in which the cover or closure member 16a is of considerably smaller depth or thickness than the conventional cover 16 diagrammatically illustrated in Fig. 1. While the depth of the body of insulation retained between the inner and outer walls of the cover sections 36a in Fig. 2 is not nearly as great as that in Fig. 1, nevertheless it is highly effective and can be made smaller in accord with the invention by providing a plurality of sheets 43a in spaced relation at the underside of the cover 16a to reduce heat transfer into the storage space 15 due to radiation. The sheets 43a are fixed to the inner walls 39a by screws 44a and held in spaced relation relative to one another and to the inner walls by hollow spacer members 45a which are similar to the spacer members 45 in Fig. 1 and desirably formed of material having poor thermal conducting properties. The air in the gaps 46a between the sheets 43a and between the uppermost sheets and the underside of the cover 16a forms a more or less stagnant air body which increases the overall heat insulating effect of the cover 16a.

Another embodiment of the invention is shown in Fig. 3 which differs from the preceding embodiments in that the sheets 43b provided for reducing transfer of heat into storage space 15 by radiation are entirely independent of the cover 16b which is of conventional thickness and like the cover 16 in Fig. 1.

In Fig. 3 it will be seen that the sheets 43b are in overlapping relation and provided with pins or knobs 47 to facilitate moving each sheet 43b toward the other to gain access into the storage space 15. Suitable rails 48 may be provided at opposing side walls of the storage space 15 for supporting the sheets 43b and guiding the latter when moved between their open and closed positions.

It will be understood that the particular manner in which the sheet or sheets of metal foil are associated with a closure member will vary in practice depending upon the different conditions encountered. By way of example and without limitation, the space between the radiation shield or metal foil sheeting and underside of a cover desirably should be in the neighborhood of 4 to 8 mm. when using a conventional cover having a depth of insulation of about 40 mm. In such case it has been found that the height to which frozen food packages may be safely stored in the storage space can be increased by about 40 to 50 mm. which is approximately the thickness of containers in which most frozen foods are now usually packaged.

When covers are used in which the body of insulation is of less depth or thickness than in conventional covers, a radiation shield formed of a number of spaced apart sheets of metal foil is preferably employed. When such a radiation shield is employed, the distance between the underside of the cover and nearest metal foil, as well as the distance between the several metal foils, desirably should be in a range of about 4 to 8 mm.

In view of the foregoing, it will now be understood that an effective radiation shield has been provided to reduce heat transfer into a storage space of a refrigerator by radiation from an inner wall of a closure member adapted to close an access opening of the space. Since the radiation shield is fixed to the cover only by screws in the embodiments of Figs. 1 and 2 and the radiation shield is entirely independent of the cover in the embodiment of Figs. 3 and 4, it will be apparent that in each embodiment the heat transfer relation of the radiation shield with respect to the body of insulation retained in the cover is relatively small compared to the heat conductive relation of the inner wall of the cover with respect to the outer wall thereof.

This is so because, while the spaced apart inner and outer walls are connected by a rigid trim strip or other comparable part which is formed of poor heat conducting material, the heat conductive path between the spaced apart walls of the cover is substantially greater than the insignificant heat conductive path which is provided in Figs. 1 and 2 by the screws from the insulation within the cover to the metal foil serving as the radiation shield. Since the radiation shield in Figs. 3 and 4 is entirely independent of the cover and not carried by the latter, the body of insulation therein is thermally segregated from the radiation shield.

Although several embodiments of the invention have been shown and described, such variations and modifications are contemplated as fall within the true spirit and scope of the invention, as pointed out in the following claims:

What is claimed is:

1. In the art of preserving food and the like in a space which is formed with a top access opening and thermally insulated from the surroundings when the access opening is closed, the method which comprises abstracting heat from said space to effect cooling therein, transferring heat from the surroundings into said space due to radiation from a bounding wall surface which is at the access opening and defines the upper extremity of said space when the access opening is closed, reducing such heat transfer by re-radiating heat back to said bounding wall surface through a zone of said space from a region thereof which is beneath the closely adjacent to and spaced from said bounding wall surface, and, as the result of cooling effected in said space, inducing natural circulation of air therein including said zone in the extreme upper end thereof, the air in said zone tending to be relatively stagnant and resisting natural circulation of air induced in said space.

2. In the art of preserving food and the like in a space which is formed with a top access opening and thermally insulated from the surroundings when the access opening is closed, the method which comprises abstracting heat from said space to effect cooling therein and induce natural circulation of air, transferring heat from the surroundings in said space due to radiation from a bounding wall surface which is at the access opening and defines the upper extremity of said space when the access opening is closed, reducing such heat transfer by re-radiating heat back to said bounding wall surface through a zone of said space from a number of spaced apart regions thereof which are beneath and closely adjacent to and spaced from said bounding wall surface and in poor thermal relation therewith, and, as the result of cooling effected in said space, inducing natural circulation of air therein including said zone in the extreme upper end thereof, the air in said zone tending to be relatively stagnant and resisting natural circulation of air induced in said space.

3. In the art of preserving food and the like in a vertically extending space which is formed with a top access opening and thermally insulated from the surroundings when the access opening is closed, the method which comprises abstracting heat from said space to effect cooling therein, transferring heat from the surroundings into said space due to radiation from a bounding wall surface which is at the access opening and defines the upper extremity of said space when the access opening is closed, reducing such heat transfer by re-radiating heat back to said bounding wall surface through a zone of said space from a region thereof which is beneath and closely adjacent to and spaced from said bounding wall surface and in poor thermal relation therewith so as to reduce the vertical temperature gradient in said zone from said bounding wall surface to said region and, as the result of cooling effected in said space, inducing natural circulation of air therein including said zone in the upper extremity thereof, the air in said zone tending to be relatively stagnant and resisting natural circulation of air induced in said space.

4. In a refrigerator including a cabinet having a thermally insulated interior or storage space formed with a top access opening and refrigeration apparatus for cooling such space and inducing natural circulation of air in said space, thermally insulated structure for closing the access opening comprising a closure member including spaced apart top and bottom walls having insulation therebetween and a side wall bridging the gap between the spaced apart walls and concealing the insulation from view, said bottom wall constituting the innermost wall surface of the thermally insulated interior when the access opening is completely closed by said thermally insulated structure, a heat radiating shield external to the walls of said closure member and cooperating therewith for reducing heat transfer into said space by radiation from said bottom wall, said shield being beneath and closely adjacent to and spaced from said bottom wall and in poor heat conductive relation therewith when the top access opening is completely closed by said thermally insulated structure, the space between said heat radiating shield and said bottom wall being located at the extreme upper part of the cabinet interior and in communication with air circulating in said storage space.

5. Apparatus as set forth in claim 4 in which said heat radiating shield comprises aluminum sheeting having bright reflecting surfaces.

6. Apparatus as set forth in claim 4 in which said heat radiating shield comprises a plurality of spaced apart sheets having bright reflecting surfaces.

7. Apparatus as set forth in claim 4 including means for securing said heat radiating shield to the closure member, such means providing a poor heat conductive path between said closure member and said shield.

8. Apparatus as set forth in claim 4 including means independent of said closure member for maintaining said heat radiating shield in position beneath and adjacent to said closure member when the latter closes the top access opening.

9. Apparatus as set forth in claim 4 in which said heat radiating shield comprises a plurality of sheets having bright reflecting surfaces, such sheets being substantially in the same plane and relatively movable with respect to one another in such plane.

10. In a refrigerator including a cabinet having a thermally insulated interior or storage space provided with a top access opening and means to effect cooling of such space, thermally insulated structure for closing the access opening comprising a closure member including spaced apart top and bottom walls having insulation therebetween and a side wall bridging the gap between the spaced apart walls and concealing the insulation from view, said bottom wall constituting the innermost wall surface of the thermally insulated interior when the access opening is completely closed by said thermally insulated structure, a heat radiating shield comprising a layer of material having a surface for reducing heat transfer into said space by radiation from the bottom wall of said closure member, said shield being positioned beneath and closely adjacent to and spaced from said bottom wall when the top access opening is closed by said closure member, the part of said space between said heat radiating shield and said bottom wall being in communication with air circulating in the part of said space beneath said shield, and supporting means for said shield to maintain the heat conductive relation of said heat radiating shield with respect to said closure member insulation relatively small compared to the heat conductive relation of said bottom wall with respect to said top wall.

11. Apparatus as set forth in claim 10 in which said supporting means supports said shield independently of said closure member.

12. In a refrigerator including a cabinet having a thermally insulated interior or storage space provided with a top access opening and means to effect cooling of such space, thermally insulated structure for closing the access opening comprising a closure member including spaced apart top and bottom walls having insulation therebetween and a side wall bridging the gap between the spaced apart walls and concealing the insulation from view, said bottom wall constituting the innermost wall surface of the thermally insulated interior when the access opening is completely closed by said thermally insulated structure, a heat radiating shield comprising a layer of material having a surface for reducing heat transfer into said space by radiation from the bottom wall of said closure member, said shield being positioned beneath and closely adjacent to and spaced from said bottom wall when the top access opening is closed by said closure member, and means fixed to and carried by said closure member for supporting said shield to maintain the heat conductive relation of said heat radiating shield with respect to said closure member insulation relatively small compared to the heat conductive relation of said bottom wall with respect to said top wall.

NILS ERIK WIDELL.

REFERENCES CITED

The following references are of record in the file of this patent:

UNITED STATES PATENTS

| Number | Name | Date |
|---|---|---|
| 1,964,795 | Frary | July 3, 1934 |
| 1,993,730 | Carpenter | Mar. 12, 1935 |
| 2,044,600 | Williams | June 16, 1936 |
| 2,065,402 | Schweller | Dec. 22, 1936 |
| 2,104,548 | Schweller | Jan. 4, 1938 |
| 2,148,983 | Grubb | Feb. 28, 1939 |
| 2,150,182 | Munters | Mar. 14, 1939 |
| 2,414,061 | Richard | Jan. 7, 1947 |